_United States Patent_ [19]

Aida

[11] Patent Number: 4,983,050
[45] Date of Patent: Jan. 8, 1991

[54] BEARING SUPPORTING ARRANGEMENT
[75] Inventor: Masahiro Aida, Yokohama, Japan
[73] Assignee: Nissan Motor Company, Ltd., Japan
[21] Appl. No.: 360,794
[22] Filed: Jun. 2, 1989
[30] Foreign Application Priority Data
  Jun. 7, 1988 [JP] Japan .................................. 63-138503
[51] Int. Cl.$^5$ ........................ F16C 23/08; F16C 33/66
[52] U.S. Cl. ....................................... 384/99; 384/495;
                                      384/518; 384/901; 384/906
[58] Field of Search ................. 384/99, 495, 518, 558,
                                      384/563, 901, 906

[56] References Cited
U.S. PATENT DOCUMENTS

| | | | |
|---|---|---|---|
| 4,676,667 | 6/1987 | Komatsu et al. | 384/99 |
| 4,708,602 | 11/1987 | McEachern et al. | 384/474 X |
| 4,721,441 | 1/1988 | Miyashita et al. | 384/518 X |
| 4,738,548 | 4/1988 | Zloch et al. | 384/99 |

FOREIGN PATENT DOCUMENTS 0900602 7/1962 United Kingdom ................. 384/901

OTHER PUBLICATIONS

Japanese Utility Model Provisional Publication No. 61-134536, 8/1986.
McKee, L. W., "Ultra High Speed Ball Bearings-Their Selection and Application", Reprinted from _Missile Design and Development_, Aug. 1960, FIG. 2.

Primary Examiner—Lenard A. Footland
Assistant Examiner—William G. Battista, Jr.
Attorney, Agent, or Firm—Lowe, Price, LeBlanc, Becker & Shur

[57] ABSTRACT

A bearing supporting arrangement is provided for a turbocharger having a turbine shaft provided with turbine and compressor wheels. The bearing supporting arrangement includes first and second cylindrical oil film damper members, each of which is supported in a floating state through an oil film to the inner peripheral surface of a bearing housing thereby constituting an oil film damper. First and second annular ball bearings are coaxially fixedly supported respectively to the first and second oil film damper members. A generally cylindrical thrust receiving member is interposed between the first and second oil film damper members to be contactable with the first and second oil film damper members. The thrust receiving member is fixed at an axially intermediate portion to the bearing housing by a pin fixed to the bearing housing so as to be movable to make contact with the bearing housing. A first clearance ($C_1$) is defined between the bearing housing and the thrust receiving member, while a second clearance ($C_2$) is defined between the bearing housing and each of the first and second oil film damper members. In the above arrangement, a first ratio ($C_1/L_1$), of the first clearance ($C_1$) relative to the axial length ($L_1$) of the thrust receiving member, is set smaller than a second ratio ($C_2 L_2$) of the second clearance relative to the distance ($L_2$) between the axially outside end face of the first oil film damper member and the axially outside end face of the second oil film damper member.

7 Claims, 3 Drawing Sheets

BEARING SUPPORTING ARRANGEMENT

BACKGROUND OF THE INVENTION

1. Field of the Invention

This invention relates generally to improvements in a bearing supporting arrangement in which rolling bearings are maintained in a floating state relative to a bearing housing under the action of so-called oil film dampers and, more particularly, to a dimensional configuration of elements constituting the bearing supporting arrangement to prevent a bearings from receiving strong reaction from the bearing housing.

2. Description of the Prior Art

A variety of bearing supporting arrangements have been proposed and put into practical use. Of these, one of the type wherein bearings are supported in a floating state to a bearing housing has been disclosed, for example, in Japanese Utility Model Provisional Publication No. 61-134536. In this conventional arrangement, the bearings are adapted to rotatably support a turbine shaft of an exhaust gas turbocharger. The bearings are fixedly provided on their outer periphery respectively with oil film damper members which are supported through oil films to the inner periphery of the bearing housing, constituting so-called oil film dampers. The bearing housing is provided at its inner periphery with a pair of stop rings to which the oil film damper members are respectively contactable upon a thrust being applied through the turbine shaft to the oil film damper members. In other words, positioning of the turbine shaft in a thrust direction is accomplished by these stop rings.

However, difficulties have been encountered in the above conventional arrangement, in which it is very difficult to obtain a high accuracy of positioning for the turbine shaft relative to the bearing housing by using the stop rings because grooves (for the stop rings) formed in the bearing housing unavoidably have a relatively large clearance to facilitate installation operation of the stop rings.

In order to overcome the above problems, some propositions may be made; however, other problems will arise in which the oil film damper members are brought into contact with the inner peripheral surface of the bearing housing when a thrust is applied to the turbine shaft, and therefore the outer race of the bearing receives a reaction from the inner periphery of the bearing housing, thereby causing a misalignment between the inner and outer races of the bearing. This misalignment deteriorates smooth rotation of the bearing, degrading the durability of the bearing.

SUMMARY OF THE INVENTION

It is an object of the present invention to provide an improved bearing supporting arrangement to overcome the above-discussed problems encountered in conventional similar arrangements and other imaginable arrangements by setting a suitable dimensional relationship between a member provided for positioning a rotatable shaft and another related member.

Another object of the present invention is to provide an improved bearing supporting arrangement in which smooth rotation and high durability of rolling bearings are maintained, facilitating assembly of the bearing supporting arrangement.

A further object of the present invention is to provide an improved bearing supporting arrangement in which misalignment between the inner and outer races of a rolling bearing is effectively prevented even when there is application of a thrust to a rotatable shaft supported by the rolling bearing.

A bearing supporting arrangement of the present invention is comprised of a bearing housing defining a bore thereinside. First and second oil film damper members are located separe from each other and can be kept in a floating state relative to the bearing housing. The first and second oil film damper members coaxially securely support first and second rolling bearings, respectively, which are separate from each other. A spring is provided to bias the outer races of the first and second rolling bearings in a direction far from each other. A thrust receiving member is interposed between the first and second oil film damper members and extends generally in the axial direction of the bearing housing bore. The thrust receiving member is fixed to the bearing housing in such a manner as to substantially fix the thrust receiving member in the axial direction of the bearing housing bore and to allow the thrust receiving member to slightly move generally perpendicularly to the axis of the bearing housing bore. A first clearance ($C_1$) is defined between the bearing housing and the thrust receiving member, while a second clearance ($C_2$) is defined between the bearing housing and each of the first and second oil film damper members. In the above arrangement, a first ratio ($C_1/L_1$), of the first clearance ($C_1$) relative to the axial length ($L_1$) of the thrust receiving member, is set smaller than a second ratio ($C_2/L_2$) of the second clearance ($C_2$) relative to a distance ($L_2$) between the axially outside end face of the first oil film damper member and the axially outside end face of the second oil film damper member.

With this arrangement, when a thrust is applied in a direction to a rotatable shaft supported by the rolling bearings, the rotatable shaft inclines relative to the axis of the bearing housing bore and consequently the thrust receiving member similarly inclines to be brought into contact with the inner peripheral surface of the bearing housing. However, by virtue of the above-mentioned dimensional relationship of the first ratio ($C_1/L_1$) being smaller than the second ratio ($C_2/L_2$), the oil film damper member is prevented from being brought into contact with the inner peripheral surface of the bearing housing. As a result, the outer race of the rolling bearing is prevented from receiving a strong reaction from the inner peripheral surface a of the bearing housing, thereby maintaining a normal locational relationship between the inner and outer races of the rolling bearing. Thus, the present invention can achieve simultaneous improvements in accuracy of axial positioning for the rotatable shaft and in the durability of the rolling bearing. Additionally, installation of the thrust receiving member is made easy, thereby facilitating the assembly operation of the bearing supporting arrangement.

DETAILED DESCRIPTION OF THE INVENTION

Figure 1:
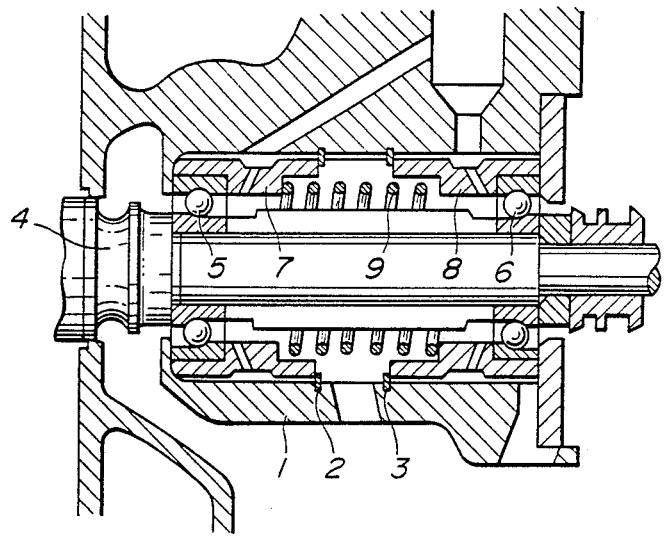
FIG. 1 is a fragmentary axial cross-sectional view of a conventional bearing supporting arrangement.
Figure 2:
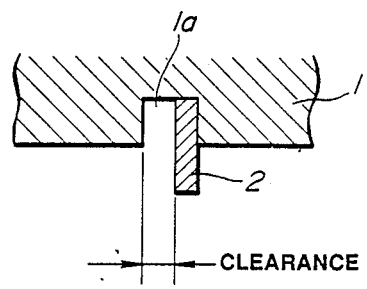
FIG. 2 is a fragmentary enlarged sectional view of a part of the arrangement of FIG. 1.

To facilitate understanding of the present invention, a brief reference will be made to a conventional bearing supporting arrangement, depicted in FIGS. 1 and 2. Referring to FIG. 1, the conventional bearing supporting arrangement forms part of an exhaust gas turbocharger and is adapted to support ball bearings 5, 6 in a floating state relative to the inner peripheral surface of a bearing housing 1. The ball bearings 5, 6 rotatably support a turbine shaft 4 which is fittingly provided thereon a compressor wheel (not shown) and a turbine wheel (not shown). In this conventional arrangement, a pair of stop rings 2, 3 are fixed to the inner peripheral surface of the bearing housing 1 so that a pair of oil film damper members 7, 8 are respectively in contact with the stop rings 2, 3. The oil film damper members 7, 8 are fixedly secured respectively to the outer races of the ball bearings 5, 6. A coil spring 9 is interposed between the oil film damper members 7, 8 to bias the oil film damper members 7, 8 in a direction to separate from each other.

With this conventional arrangement, when a thrust is applied to the turbine shaft 4, it is transmitted through the ball bearing 5, 6 and the oil film damper member 7, 8 and received by the stop ring 2, 3. Positioning of the turbine shaft 4 in a thrust direction relative to the bearing housing 1 is accomplished by the stop rings 2, 3. It will be understood that if the accuracy of such positioning is not maintained high, it is impossible to suitably maintain a clearance between the turbine wheel or compressor wheel and the inside of a housing therefor, thereby degrading the performance of the turbocharger. Thus, it is necessary to maintain high the positioning accuracy of the turbine shaft 4.

However, difficulties have been encountered in the above conventional arrangement, in which it is very difficult to obtain a high accuracy of positioning the turbine shaft relative to the bearing housing by using the stop rings 2, 3. More specifically, with reference to FIG. 2, in order to securely fix the stop ring 2, 3 in a stop ring groove 1a, a clearance as shown in FIG. 2 is necessary. If this clearance is made smaller, operation efficiency of fixing the stop ring 2, 3 is extremely lowered. Under existence of such a clearance, the location of the stop ring 2, 3 is unavoidably scattered throughout the width of the clearance, thus lowering the positioning accuracy of the turbine shaft 4 in the thrust direction relative to the bearing housing 1.

Figure 3:
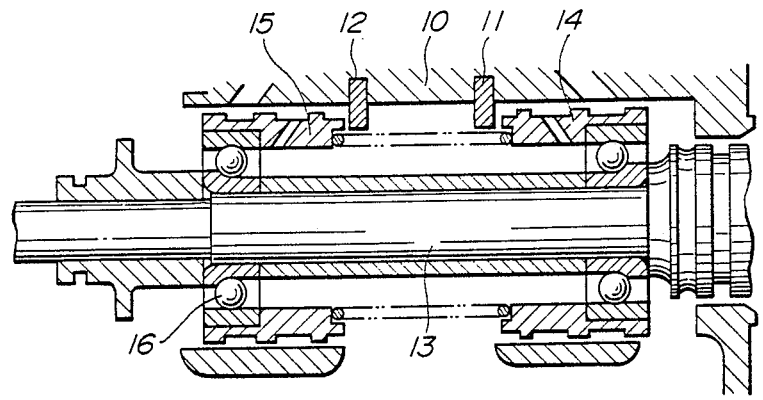
FIG. 3 is a fragmentary axial cross-sectional view of an imaginable bearing supporting arrangement which is not within the scope of the present invention.
Figure 4:
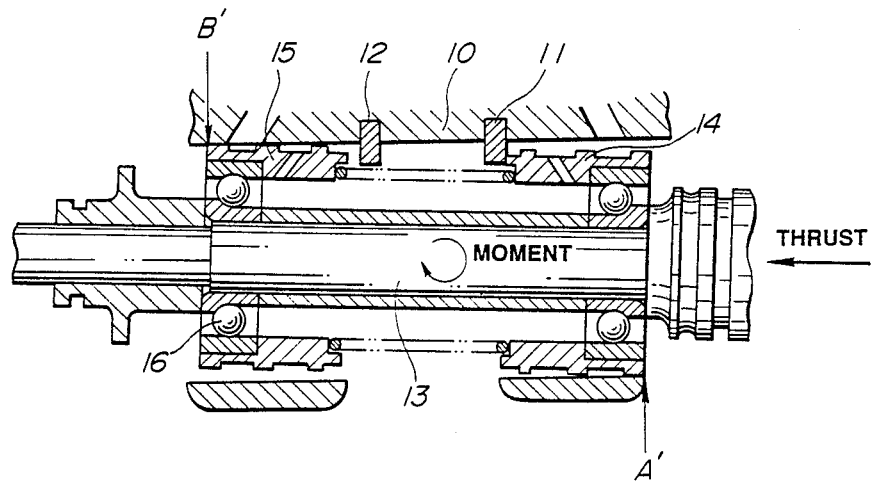
FIG. 4 is a sectional view similar to FIG. 3 but showing a state upon application of a thrust to a rotatable shaft supported by rolling bearings.

In order to solve the above problems, it will be imaginable that positioning of a turbine shaft 13 is accomplished by two pins 11, 12 as shown in FIGS. 3 and 4. The two pins 11, 12 are press-fitted in holes (not identified) of a bearing housing 10 and used in place of the stop rings in FIGS. 1 and 2. With this configuration, the accuracy of positioning the holes for pins are maintained high, and therefore positioning of a turbine shaft 13 in the thrust direction is made in a higher accuracy than in the case of using the stop rings while raising operation efficiency of assembly of the arrangement.

Figure 5:
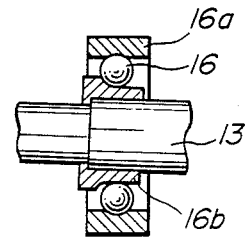
FIG. 5 is a fragmentary sectional view of a part of the arrangement of FIG. 3 upon application of a thrust to the rotatable shaft.

However, with the above imaginable configuration, for example when a thrust is applied from the turbine side to the compressor side, the turbine shaft 13 inclines, as shown to an exaggerated degree in FIG. 4, under a moment as indicated by a circular arrow. As a result, a section A' of a turbine side oil film damper member 14 and a section B' of a compressor side oil film damper member 15 are simultaneously brought into contact with the inner peripheral surface of the bearing housing 10 as shown in FIG. 4. At this time, as shown in FIG. 5, the outer race 16a of the compressor side ball bearing 16 to which the thrust is not applied is returned to its horizontal state as shown under the reaction from the bearing housing 10, and therefore a misalignment is made between the outer and inner races 16a, 16b of the bearing 16, so that normal and smooth rolling movement cannot be maintained thereby noticeably degrading durability of the bearing 16. It will be understood that the above-discussed problems may arise in a variety of bearing supporting arrangements for machines requiring a high positioning accuracy in the axial direction of members connected to a rotatable shaft, other than the arrangements for the turbocharger.

Figure 6:
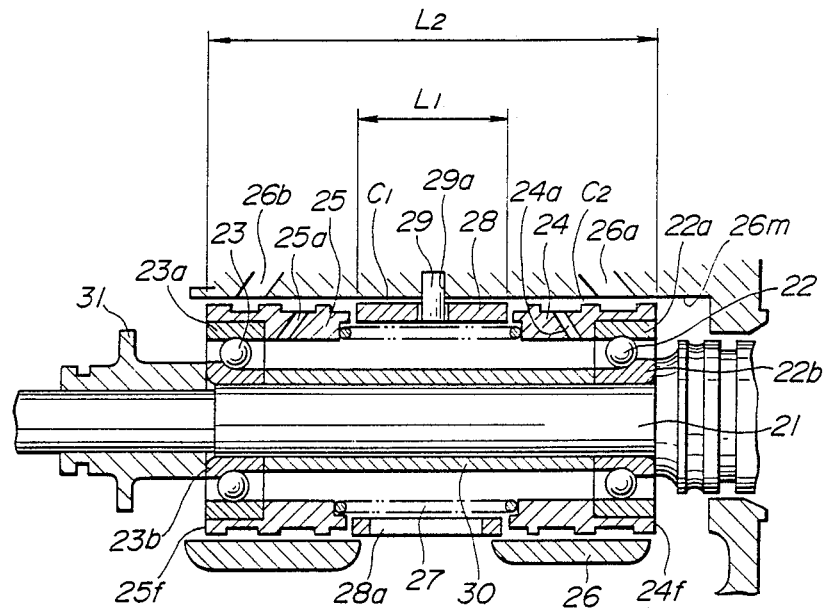
FIG. 6 is a fragmentary sectional view showing a preferred embodiment of a bearing supporting arrangement in accordance with the present invention.
Figure 7:
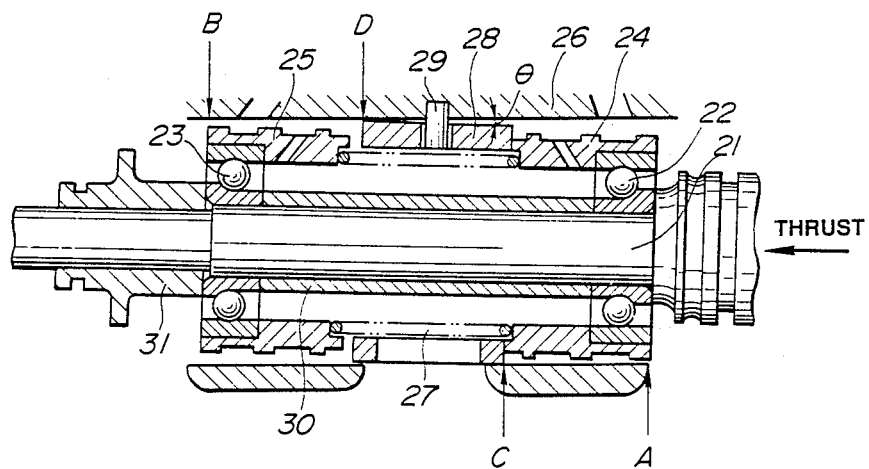
FIG. 7 is a sectional view similar to FIG. 6 but showing a state upon application of a thrust to a rotatable shaft supported by rolling bearings.

In view of the above description of the conventional bearing supporting arrangement, reference is now made to FIGS. 6 and 7 wherein a preferred embodiment of a bearing supporting arrangement according to the present invention is illustrated. The bearing supporting arrangement forms part of an engine supercharger including for example a known, exhaust gas turbocharger, and comprises a generally cylindrical bearing housing 26 defining thereinside a cylindrical bore 26m. A pair of annular (turbine and compressor side) ball bearings 22, 23 are supported relative to the inner peripheral surface (defining the bore 26m) of the bearing housing 26. The ball bearings 22, 23 are coaxially fixedly secured respectively to a pair of oil film damper members 24, 25 which are generally cylindrical. More specifically, the outer race 22a of the ball bearing 22 is press-fitted to an annular cutout (no numeral) formed at the axially outside end section of the oil film damper member 24. Similarly, the outer race 23a of the ball bearing 23 is press-fitted to an annular cutout (no numeral) formed at the axially outside end section of the oil film damper member 25. Each oil film damper member 24, 25 is supported through an oil film to the inner peripheral surface of the bearing housing 26 in a floating state, thus constituting a so-called oil film damper. The inner race 22b of each ball bearing 22, 23 is fixedly mounted on a turbine shaft 21 which is provided at its one end section (on the side of the ball bearing 22) with a turbine wheel (not shown) and at the other end section (on the side of the ball bearing 23) with a compressor wheel (not shown).

The oil film damper members 24, 25 are located separate from each other. A compression coil spring 27 is disposed between the axially inside end faces of the oil film damper members 24, 25 to bias each of the oil film damper members 24, 25 in a direction such that the ball bearing outer races 22a, 23a separate from each other. Additionally, a thrust receiving member 28 is disposed between the axially inside end faces of the oil film damper members 24, 25 so that it is fixed in the axial direction of the bearing housing 26. More specifically, the thrust receiving member 28 is generally cylindrical and located so that its axis is generally aligned with the axis of the cylindrical bore 26m of the bearing housing 26. The cylindrical thrust receiving member 28 is formed at its axially intermediate portion with a hole (no numeral) in which a cylindrical pin 29 fixed to the bearing housing 26 is engaged. A bearing spacer 30 is mounted on the turbine shaft 21 and interposed between the inner races 22b, 23b of the ball bearings 22, 23. The turbine shaft 21 is fittingly provided thereon with an oil splashing member 31 located outside the compressor side ball bearing 23 in order to splash lubricating oil radially outwardly under the centrifugal force thereof.

The bearing housing 26 is formed with oil inlet openings 26a, 26b through which lubricating oil is supplied to the clearance between the outer peripheral surface of the oil film damper member 24, 25 and the inner peripheral surface of the bearing housing 26 thereby forming an oil film in the clearance. The oil film provides lubrication between the oil film damper member 24, 25 and the bearing housing 26 and a vibration damping action of the ball bearing 22, 23 relative to the bearing housing 26. The oil film damper member 24, 25 is formed with an oil supply passage 24a, 25a through which lubricating oil flows out of the inner peripheral surface of the oil film damper member 24, 25 and is supplied to the ball bearing 22, 23 thereby accomplishing lubrication of the ball bearing 22, 23. Thereafter, the lubricating oil is discharged out of the bearing housing 28 through the oil outlet opening 28a formed in the thrust receiving member 26.

In this embodiment, a ratio ($C_1/L_1$) of the clearance $C_1$ between the inner peripheral surface of the bearing housing 26 and the outer peripheral surface of the thrust receiving member 28 relative to the axial length of the thrust receiving member 28 is set smaller than a ratio ($C_2/L_2$) of a clearance $C_2$ between the inner peripheral surface of the bearing housing 26 and the outer peripheral surface of each oil film damper member 24, 25 relative to a distance $L_2$ between the axially outside end faces 24f, 25f of the oil film damper members 24, 25. It will be understood that the clearance $C_1$, $C_2$ are defined respectively by the thrust receiving member 28 and each oil film damper member 24, 25 which are in their neutral state as shown in FIG. 6.

The manner of operation of the above bearing supporting arrangement upon application of a thrust will be discussed hereinafter with reference to FIG. 7.

For example, when a thrust is applied from the turbine side to the turbine shaft 21 as shown in FIG. 7, the oil film damper member 24 is brought into contact with the thrust receiving member 28. At this time, the turbine shaft 21 inclines in a direction to lower its turbine side as shown in FIG. 7 because the thrust receiving member 28 is fixed only at the intermediate portion on its one side (upper side in FIGS. 6 and 7) to the bearing housing 26. With this inclination of the turbine shaft 21, the oil film damper member 24, 25 and the thrust receiving member 28 incline in the same direction as the turbine shaft 21.

At this time, the lower and upper portions of the opposite end sections of the thrust receiving member 28 comes into contact with the inner peripheral surface of the bearing housing 26 at the sections C and D shown in FIG. 7. The lower and upper portions of the opposite end sections of the thrust receiving member 28 are opposite to each other with respect to the axis of the thrust receiving member 28. In the state of FIG. 7, an inclination angle $\theta$ of the thrust receiving member 28 is determined.

Here, there is a relationship of $\sin \theta = C_1/L_1$. This relationship and the above relationship between the ratios $C_1/L_1$ and $C_2/L_2$ lead to the following relationship concerning a shift amount $\Delta r$ of the axially outside end face 24f, 25f of the oil film damper member 24, 25 in a direction perpendicular to the axis of the bore 26m of the bearing housing 26:

$$\Delta r = L_2 \cdot \sin \theta$$
$$= L_2 \cdot C_1/L_1 < L_2 \cdot C_2/L_2, \text{ i.e., } r < C_2$$

In other words, the shift amount $\Delta r$ is smaller than the clearance $C_2$ between the bearing housing 26 and the oil film damper member 24, 25, and therefore the axially outside end section of the oil film damper member 24, 25 can be prevented from coming into contact with the inner peripheral surface of the bearing housing 26. Accordingly, a strong reaction is prevented from being applied from the bearing housing 26 through the oil film damper member 24, 25 to the ball bearing 22, 23. As a result, no misalignment due to the reaction from the bearing housing 26 is made between the outer race 22a, 23a and the inner race 22b, 23b, thus securing a sufficient durability of the ball bearing 22, 23.

In this embodiment, a high accuracy of positioning for the turbine shaft 21 in the axial direction can be attained by managing the machining accuracy of only the diameter of the pin (having a circular cross-section) 29 and the diameter of a hole 29a formed in the bearing housing 26. Accordingly, such positioning of the turbine shaft 21 can be greatly facilitated with improved accuracy as compared with the conventional case shown in FIGS. 1 and 2 in which the stop rings 2, 3 are used for the purpose of positioning the turbine shaft. The thus positioning accuracy can maintain turbocharger performance high.

While the principle of the present invention has been shown and described as being applied only for the turbocharger, it will be appreciated that the principle of the present invention may be applied to other machines requiring a high positioning accuracy of a rotatable shaft in its axial direction. Additionally, the principle of the present invention may be applied to like bearing supporting arrangements using rolling bearings other than ball bearings.

What is claimed:

1. A bearing supporting arrangement for a turbocharger having a turbine shaft, comprising:

a bearing housing defining a bore thereinside, first and second generally cylindrical oil film damper members located separate from each other with a distance ($L_2$) separating their respective axially outside faces, each of said first and second oil film damper members being separated from a surface of said bearing housing bore to define therebetween a second clearance ($C_2$) which is filled with a lubricating oil;

first and second rolling bearings which are separate from each other and are coaxially fixedly secured respectively to said first and second oil film damper members;

a compression coil spring disposed between axially inside end faces of said first and second oil film damper members;

a generally cylidrical thrust receiving member of a length ($L_1$) smaller than said distance separating said axially outside end faces ($L_2$), interposed between the axially inside end faces of said first and second oil film damper members and extending generally in an axial direction of said bearing housing bore, the outer peripheral surface of said thrust receiving member being separated from the adjacent surface of said bearing housing bore to define therebetween a first clearance ($C_1$);

a fixing pin secured to said bearing housing and engaged with with an axially intermediate portion of a cylindrical wall of said thrust receiving member so that said thrust receiving member is slightly movable in a direction generally perpendicular to the axis of said bearing housing bore to be contactable with the surface of said bearing housing bore, a first ratio ($C_1/L_1$), of said first clearance ($C_1$) realative to said axial length ($L_1$) of said thrust receiving member being selected to be smaller than a ratio ($C_2/L_2$) of said second clearance relative to said distance ($L_2$) separating said outside axial end faces.

2. A bearing supporting arrangement as claimed in claim 1, wherein:

said first and second oil film damper members are coaxially fixedly secured respectively on the outer races of said first and second rolling bearings.

3. A bearing supporting arrangement as claimed in claim 2, wherein:

said thrust receiving member is coaxial with said bearing housing bore, one of opposite end faces of said thrust receiving member being contactable with the axially inside end face of said first oil film damper member.

4. A bearing supporting arrangement as claimed in claim 3, further comprising:

means for allowing the axis of said thrust receiving member to incline relative to the axis of said bearing housing bore.

5. A bearing supporting arrangement as claimed in claim 1, further comprising:

means for forming an oil film in said first clearance.

6. A bearing supporting arrangement as claimed in claim 1, wherein:

said thrust receiving member is disposed around said spring.

7. A bearing supporting arrangement as claimed in claim 1, wherein:

each of said first and second rolling bearings is a ball bearing.

* * * * *